United States Patent [19]

McMillen, Jr. et al.

[11] 4,185,208
[45] Jan. 22, 1980

[54] ANTI-PUMP CIRCUIT BREAKER

[75] Inventors: James W. McMillen, Jr., Wilkins Township, Allegheny County; James D. Finley, Monroeville, both of Pa.

[73] Assignee: Westinghouse Electric Corp., Pittsburgh, Pa.

[21] Appl. No.: 877,780

[22] Filed: Feb. 14, 1978

[51] Int. Cl.² .............................................. H01H 71/72
[52] U.S. Cl. ................................. 307/140; 307/142; 361/72; 361/114; 361/115
[58] Field of Search ....................... 307/139, 140, 142; 361/114, 189, 59, 71, 72, 74, 75, 115

[56] References Cited

U.S. PATENT DOCUMENTS

| | | | |
|---|---|---|---|
| 2,735,039 | 2/1956 | Schuh | 361/21 |
| 2,846,621 | 8/1958 | Coggeshall | 361/114 |
| 3,644,790 | 2/1972 | Kozlovic et al. | 361/115 |
| 3,818,276 | 6/1974 | Jacobs | 361/114 |

Primary Examiner—L. T. Hix
Assistant Examiner—James L. Dwyer
Attorney, Agent, or Firm—M. J. Moran

[57] ABSTRACT

The circuit breaker is taught with an anti-pumping control circuit. If the circuit breaker closes on a fault and quickly reopens without the closing switch being either mechanically or electrically released in the interim, reclosure of the circuit breaker either by an automatic reclosure or by the mere fact that the closing switch remains closed will be prevented until the closing switch is once again opened. In addition, if the closing switch is actuated prior to power being applied to the circuit breaker control system, the circuit breaker will not close when power is applied. The closing spring will be charged, however, for a subsequent circuit breaker closing after release and reactuation of the closing switch.

7 Claims, 19 Drawing Figures

B-O,S-D

B-O,S-C'NG

B-O,S-C

B-C, S-C'NG

B-C, S-C

B-O'NG, S-C

B-O, S-C

B-C, S-C'NG

B-C, S-C

BK-O'NG, S-C

BC, SC

BK-O'NG, S-C

B-O, S-C

B-O, S-D

B-O, S-C'NG

B-O, S-C

ANTI-PUMP CIRCUIT BREAKER

BACKGROUND OF THE INVENTION

The subject matter of this invention relates generally to circuit breakers and to circuit breakers with an anti-pumping feature specifically.

The utilization of anti-pumping apparatus in circuit breakers is well known. Such apparatus is taught in U.S. Pat. No. 3,644,790 issued Feb. 22, 1972 to J. M. Kozlovic et al. and assigned to the assignee of the present invention. Generally, a source of power is interconnected by way of a power switch with three parallel connected circuit each of which provide a different function. A first of the parallel connected circuits includes a spring charging motor connected in series circuit relationship with contacts which open when the spring is fully charged and which closes when the spring is not fully charged. The spring is utilized to close the separable main contacts of the circuit breaker. The second of the parallel circuits includes the trip coil for the circuit breaker. When energized, the trip coil allows mechanical energy to be applied to the separable main contacts of the circuit breaker to open those contacts. The circuit breaker usually includes main contacts and auxiliary contacts which duplicate the status of the main contacts. Said in another way, the auxiliary contacts are closed when the main contacts are closed and are open when the main contacts are open. These auxiliary contacts are generally designated as "a" contacts. The trip coil, the trip switch, and the lattermentioned auxiliary contacts are connected together in series circuit relationship such that if the trip switch is closed while the separable main contacts are closed, the trip coil will be energized to cause the separable main contacts to open. The last of the parallel circuits in the prior art includes a closing switch connected in series circuit relationship with two parallel circuits. The first parallel branch or combination includes an auxiliary coil sometimes known as a "Y" coil. The auxiliary coil is connected in parallel circuit relationship with the series combination of a set of complementary contacts for the separable main contacts and with the normally closed contact of the Y coil. The complementary contacts for the separable main contacts are always in a disposition which is opposite to the disposition of the separable main contacts. Said in another way, this means that when the separable main contacts are closed, the complementary contacts are opened and vice versa. The latter-mentioned parallel subcombination of the Y coil, the Y contacts and the complementary auxiliary contacts are connected in series circuit relationship with the second parallel subcombination which includes: a resistive element connected in parallel with the series combination of a spring release coil and a complementary spring status contact. The complementary spring status contact is always closed when the spring is fully charged and open when the spring is not fully charged. This arrangement is shown in FIG. 2 of the previously-mentioned prior art patent to Kozlovic. In general, if the circuit breaker is open and the spring is charged, actuation of the closing switch will cause energization of the spring release coil thus releasing the spring to close the separable main contacts. At this point, the spring will immediately begin to charge again by actuation of the spring charging motor. Once the spring has again become fully charged, it will remain that way until the circuit breaker contacts open in which case the spring can be utilized to quickly reclose the circuit breaker main contacts once again. However, in the event that the circuit breaker is closed on a fault such that it opens again immediately, it is not desired to perform the wasted and even dangerous function of continuously closing the circuit breaker on the same fault. Consequently, most circuit breaker apparatus have an anti-pumping feature whereby reclosure of the circuit breaker will not occur until the closing switch has been deenergized and subsequently reenergized. This prior art anti-pump feature is desired in all circuit breaker control systems and is implemented in most. One of the disadvantages of the prior art control system, however, is the requirement that the complementary auxiliary contacts for the separable main contacts be operable. The complementary contacts in question are generally designated as the b contacts. These contacts have the characteristic of being open when the separable main contacts are closed and vice versa as was described previously. If for some reason, these contacts do not open when the separable main contacts close, the anti-pumping feature of the prior art circuit breaker will be defeated and catastrophic results may follow. Generally, in order for the closing of the separable main contacts to occur, it is necessary for the circuit breaker closing spring to discharge thus actuating a mechanism which eventually closes the separable main contacts and opens the auxiliary contacts. If the spring discharges in an appropriate manner, but something happens with the remaining portion of the linkage to prevent the auxiliary contacts from opening, the anti-pump feature will be defeated and circuit breaker pumping may occur. Another disadvantage with the prior art circuit breaker system lies in the fact that it is essentially a voltage divider type control system. It has generally been found that voltage divider type control systems require rather precise adjustment and balancing among the appropriate portions thereof. As an example, in the prior art system, resistance coordination is required between the intrinsic resistance of the Y coil, the spring release coil, and the main resistor R. It would be advantageous, therefore, if an anti-pumping circuit breaker could be found which eliminates the need for critical resistance coordination between components thereof and which performed the anti-pumping function effectively. An electronic circuit for utilization in controlling an alternating current line generator is disclosed in U.S. Pat. No. 2,735,039, issued Feb. 14, 1956 by N. F. Schuh, Jr. and entitled "Overvoltage Protection for Alternating Current Generators". This circuit is essentially a latching circuit rather than an anti-pumping circuit. It is significantly distinguished from the present invention by the fact that the utilization or need for an anti-pumping operation is manifestly not envisioned. This is clear from the fact that the switch arrangement which includes the wiper or blade 22 and the contacts 23 and 24 render a pumping action impossible by its mere construction. It is easy to envision that it is not possible to attempt to reset and trip the circuit at the same time because of the interarrangement of the elements.

SUMMARY OF THE INVENTION

In accordance with the invention, an anti-pumping circuit breaker apparatus is taught which provides two useful features. One feature lies in the fact that the anti-pump arrangement is such that resistance coordination between parts of the circuit apparatus is minimized. Another feature lies in the fact that the anti-pumping feature is initiated merely by the discharging of the circuit breaker main contact closing spring in appropriate circumstances. The sequential operation of mechanisms in the final opening of an auxiliary contact is rendered unnecessary in the present invention. One embodiment of the invention comprises open separable main contacts, a discharge spring for closing those contacts, an apparatus for charging the spring and status contacts which close when the spring is discharged and which open when the spring is charged. There is also provided a spring release coil which operates for the purpose of discharging the spring. Part of the invention includes an auxiliary coil which has a first normally open set of contacts which are connected in series circuit relationship with the auxiliary coil and which are connected in parallel circuit relationship with the previously described status contacts. The first normally open contacts provide a sealing function or latching function. The auxiliary coil also has a second set of contacts which are normally closed and which are connected in series circuit relationship with the spring release coil for preventing energization thereof when the auxiliary coil is energized. There is also provided a circuit breaker closing switch, a source of power for energizing the apparatus and a power switch which is connected to the source and in independent series circuit relationship with the spring charging means and the circuit breaker closing switch. The circuit breaker closing switch is connected in independent series circuit relationship with the spring release coil and the auxiliary coil. If the closing switch is closed when the power switch is closed, it actuates the spring charging mechanism to charge the closing spring simultaneously with the energization of the auxiliary coil to therefore seal or latch the auxiliary coil even after the status contacts have opened. This maintains the second set of auxiliary coil contacts in an open state which in turn prevents the energization of the spring release coil even after the spring has been charged and even with the closing switch retained in the closed state until the closing switch has been reopened and once again closed.

BRIEF DESCRIPTION OF THE DRAWINGS

For a better understanding of the invention, reference may be had to the preferred embodiments exemplary of the invention shown in the accompanying drawings in which.

DESCRIPTION OF THE PREFERRED EMBODIMENTS

Figure 1:
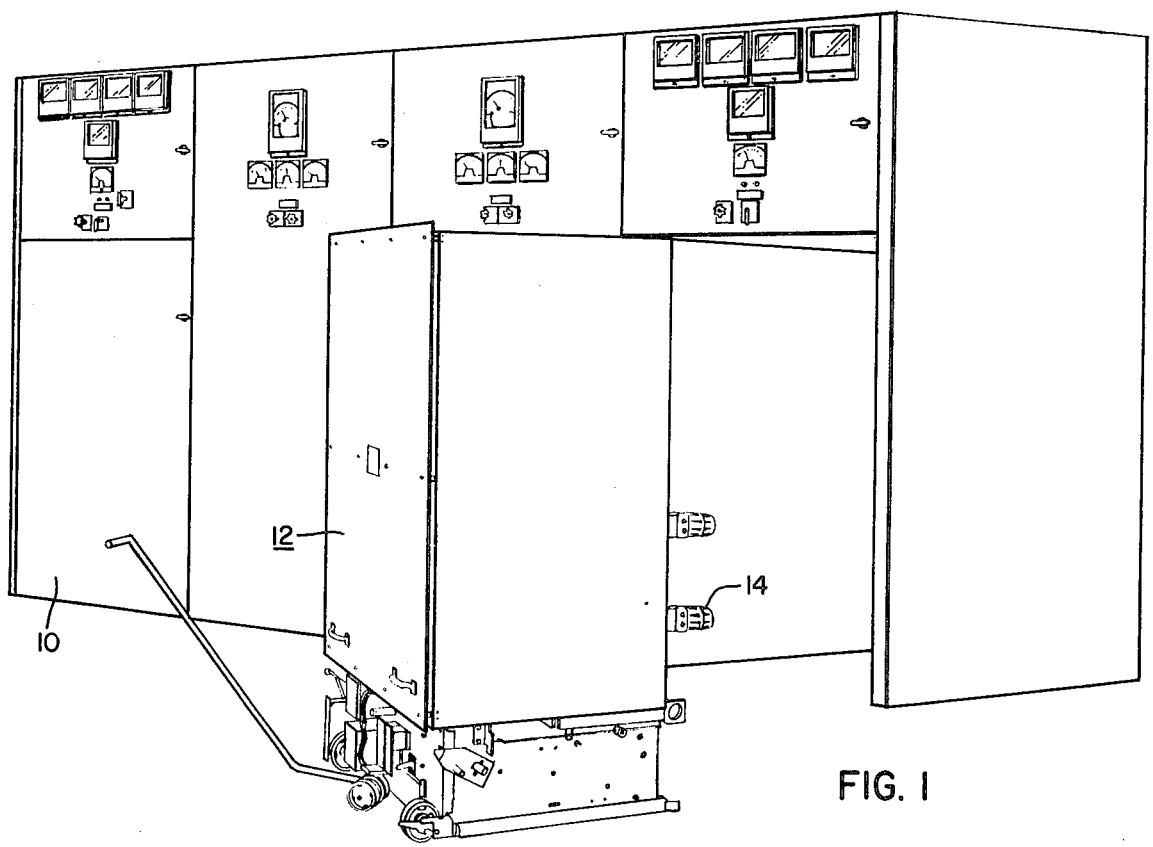
FIG. 1 shows draw-out circuit breaker apparatus and associated metal clad control panels of the type which include the preferred anti-pumping circuit.
Figure 2:
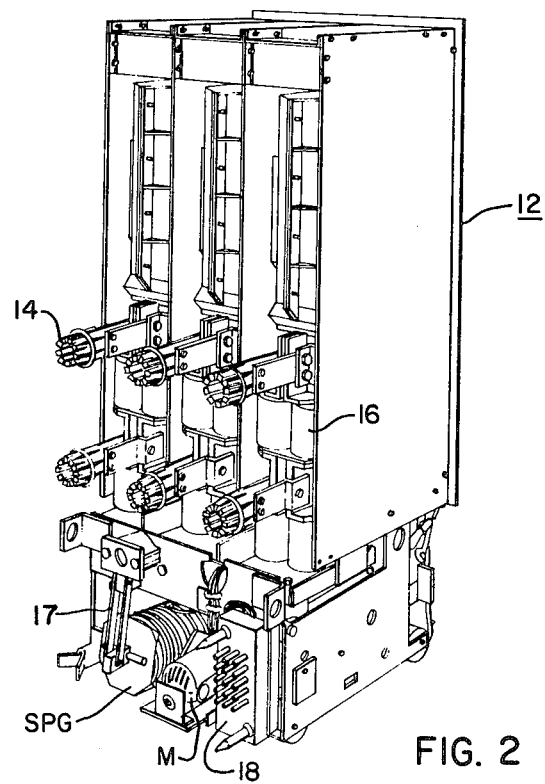
FIG. 2 shows a rear view of the draw-out circuit breaker apparatus of FIG. 1.

Referring now to the drawings and FIGS. 1 and 2 in particular, a metal-clad switchgear station 10 with a draw-out type circuit breaker 12 is shown. This metal-clad switchgear station may be of the type known as DHP MEDIUM VOLTAGE METAL-CLAD SWITCHGEAR, but, of course, is not limited to that application. The draw-out breaker 12 may include disconnectable main electrical terminals 14 which mate with or engage stationary stubs (not shown) in the switchgear station 10 when the circuit breaker 12 is properly inserted in place. FIG. 2 in particular shows circuit interrupter main contact apparatus 16, such as vacuum contacts, which are the separable main contacts for the circuit breaker or circuit interrupter 12. Shown to the lower right in FIG. 2 is a set of auxiliary connectors 18 which may contain or interconnect with auxiliary contacts, latch connect switches, and other peripheral electrical contact and control apparatus. There is also shown a spring charging motor M which is actuated at an appropriate time to charge the circuit breaker closing spring SPG. Actuation of a charged circuit breaker closing spring SPG operates through mechanical linkages, a portion of which is shown at 17 to cause closing of the separable main contacts contained within the apparatus 16 under appropriate circumstances.

Figure 3:
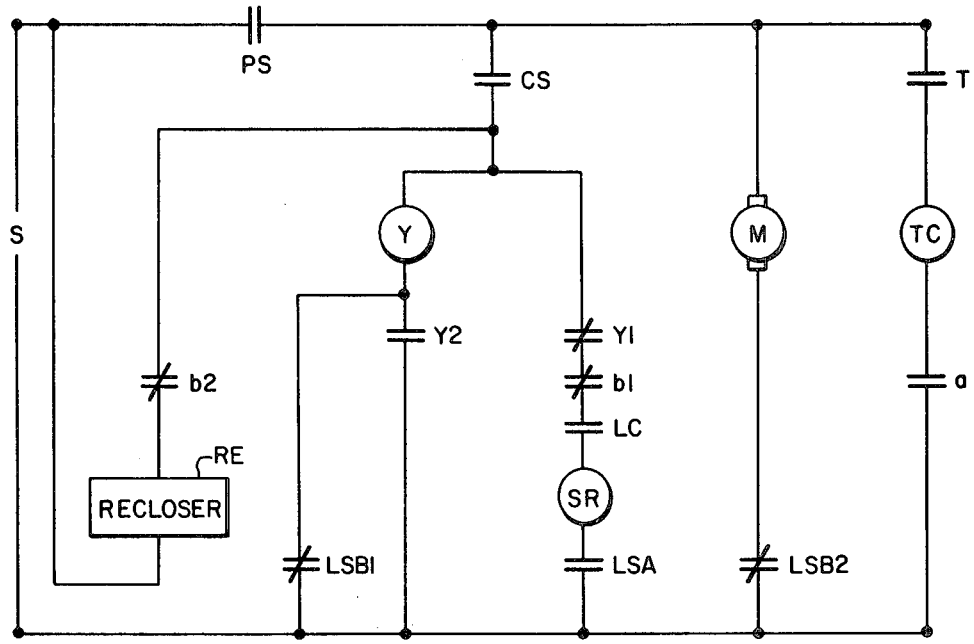
FIGS. 3 through 16 show schematic diagrams of portions of the electrical circuitry of the apparatus of FIGS. 1 and 2 in various states of operation.

Referring now to FIGS. 3 through 16, a schematic diagram of a portion of the electrical control system of the circuit breaker apparatus 12 of FIGS. 1 and 2, is shown. For purposes of simplicity of illustration, there is shown in all the drawings a source of electrical power S which may be D.C. electrical power. The source of power S is connected by way of a power switch PS to three parallel circuits. The simplest parallel circuit is shown to the right in FIG. 3 for example and includes a trip coil TC which is connected in series circuit relationship with a normally-open trip switch T and with auxiliary contact a for the separable main contacts (not shown). The auxiliary contact a has the characteristic of being opened when the separable main contacts are opened and being closed when the separable main contacts are closed. The next parallel branch circuit, to the left of the one containing the trip coil TC, includes a schematic representation of the spring charging motor M shown in FIG. 2. This motor M is controlled by a charging spring status switch LSB2 which performs the function of closing when the spring SPG of FIG. 2 is in a discharged state and of opening when the latter spring SPG is in a charged state. Finally, to the left of the latter parallel arrangement is shown a more complicated parallel arrangement which includes a circuit breaker closing switch CS connected in series circuit relationship with two parallel subcircuits. The first parallel subcircuit includes a spring release coil SR which is connected in series circuit relationship with the complementary auxiliary contact b1 for the separable main contacts, a latch check switch LC, a complementary spring status switch SAL and an auxiliary coil contact Y1. The complementary switch b1 has the characteristic of being opened when the separable main contacts of the circuit breaker are closed and of being closed when the separable main contacts of the circuit breaker are opened. Said in another way, contact b1 is the complement of contact a. The latch check switch LC has the characteristic of being closed when the circuit breaker is in appropriate mechanical alignment for a circuit breaker closing operation. The spring status switch LSA is complementary with the spring status switch LSB2. That is to say it provides the function of being closed when the spring SPG is charged and of being opened when the spring SPG is discharged. The contact Y1 represents one of two contacts for an auxiliary coil Y. The contact Y1 has the characteristic of being normally closed when the Y coil is not energized and of being opened when the Y coil is energized. The second parallel subcircuit which is connected in independent series circuit relationship with the closing switch CS contains the aforementioned auxiliary relay coil Y which in turn is connected in series with the parallel arrangement of one set of its own contacts Y2 and with a second spring status switch LSB1. The contact Y2 has the characteristic of being normally open when the Y coil is not energized and of being closed when the Y coil is energized. Switch LSB1 essentially operates in exactly the same fashion as spring status switch LSB2. That is to say spring status switch LSB1 is opened when the spring SPG is in a charged state and is closed when the spring SPG is in a discharged state. Shown further to the left of the Y coil is a recloser RE connected in series with a second auxiliary contact b2 which provides the same function as the auxiliary contact b1. Consequently, recloser RE is interconnected by way of contact b2 with the spring release coil SR at the appropriate time to close the circuit breaker.

OPERATION OF THE ANTI-PUMPING CIRCUIT BREAKER APPARATUS

With respect to the embodiment of the invention described in the following figures, it is to be noted that the breaker main contacts and the closing spring are not shown for purposes of simplicity of illustration. However, in each case, the status of these two elements will be noted. In referring to FIG. 3, an initial state for the circuit breaker control system is shown. In this case, the circuit breaker main contacts are open and the closing spring is discharged. The power switch PS which is utilized to connect the source S with the remaining portion of the circuit is opened. The closing switch CS is also opened as is the trip switch T. In this initial state, complementary contacts b1 and b2 are closed and complementary contact a is opened. Furthermore, the Y coil is in a non-energized state. Consequently, the Y1 or normally closed Y contact is closed and the Y2 or normally opened Y contact is open. The latch check switch LC is opened at this time and the spring status switch LSA is opened because the spring is discharged. For the same reason, the complementary status switches LSB1 and LSB2 are closed.

Figure 4:
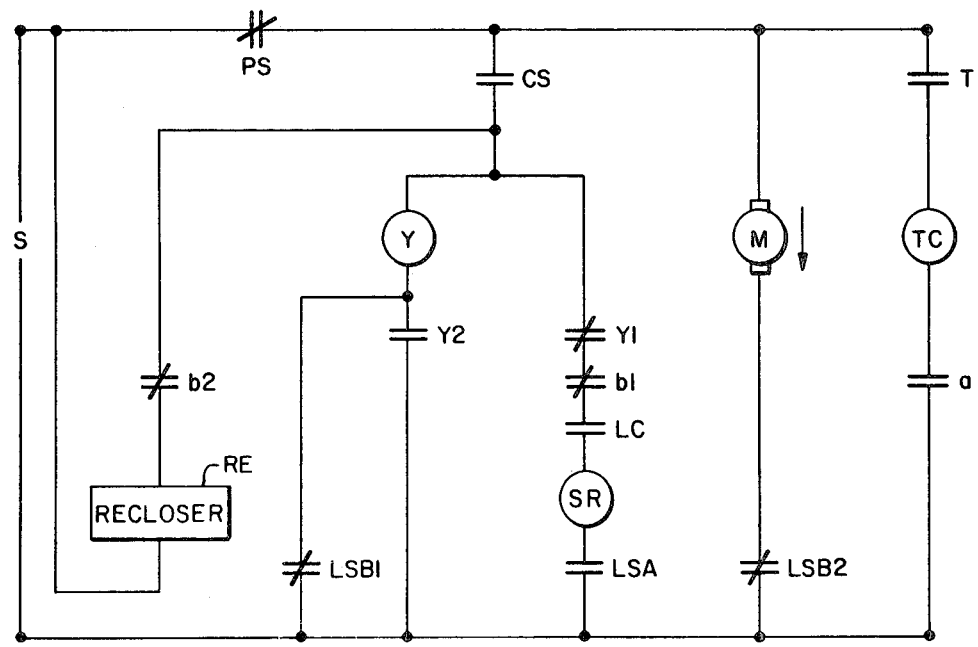

Referring now to FIG. 4, that part of the operation associated with initially closing the power switch PS is described. In particular, the power switch PS is closed, thus allowing current to flow through the spring charging motor M, and through the closed contacts LSB2 as is indicated by the arrow. The other two parallel circuits have no current flowing therethrough because the CS switch and T switch are both opened. At this point, the breaker is still opened, but the spring SPG (as shown in FIG. 2) is in a charging state as the motor is energized.

Figure 5:
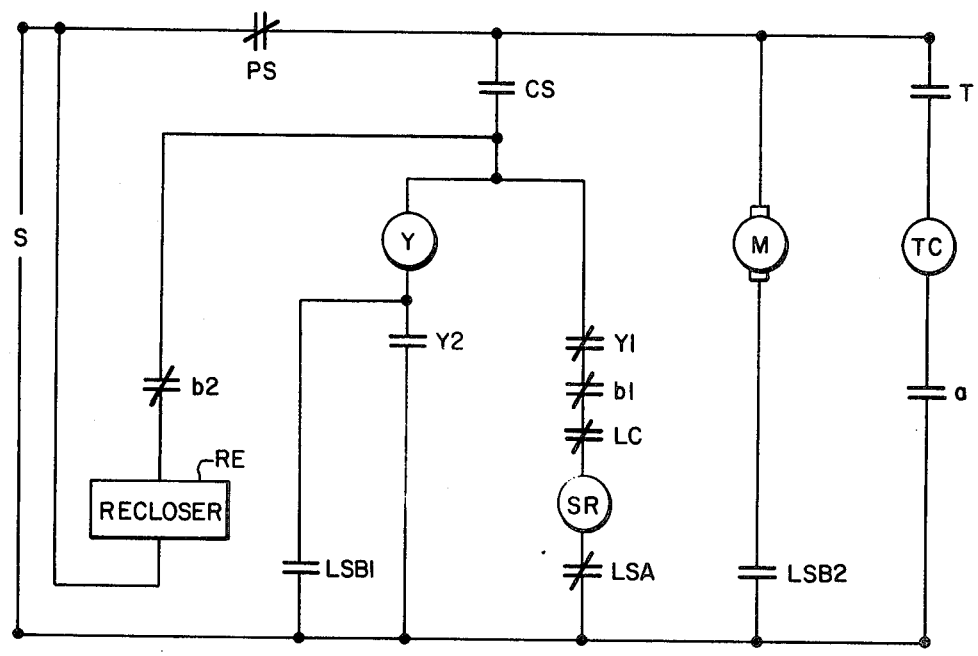

Referring now to FIG. 5, the status of the circuit at the end of the spring charging cycle is shown. In this case, the power switch PS remains closed. The breaker remains opened but the spring is charged. Since the spring is charged, the spring status switches LSB1, LSB2, and LSA reverse states from those states shown in FIGS. 3 and 4. The opening of status switch LSB2 prevents further current from flowing through the motor M because no more spring charging is necessary. At this point, the latch check switch LC closes if the appropriate mechanism for closing the circuit breaker is in a proper state. Close observation will reveal that the spring release coil SR is now in a position to be energized because each of the serially-connected contacts are all in a closed state. That is to say, contacts Y1, b1, LC and LSA are all closed. At this point, the circuit breaker is ready for a closing operation.

Figure 6:
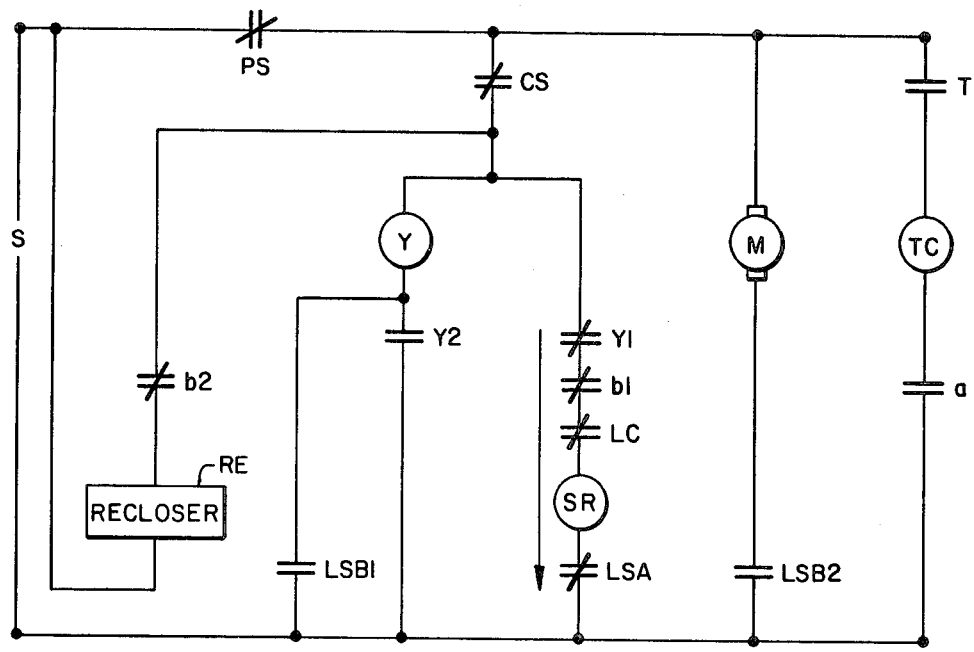
Figure 7:
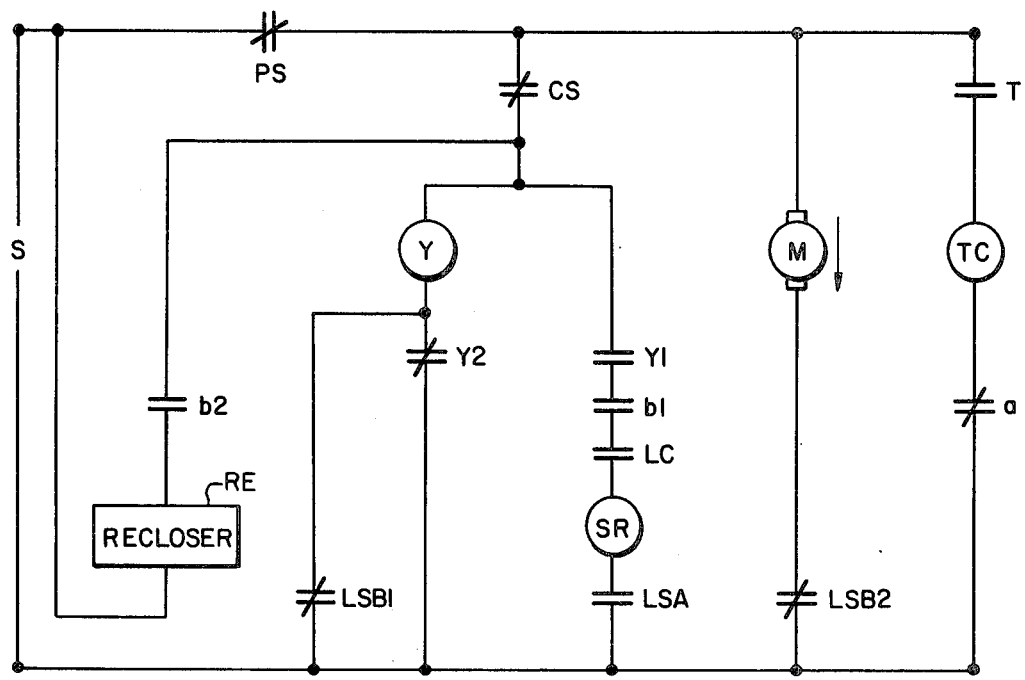
Figure 11:
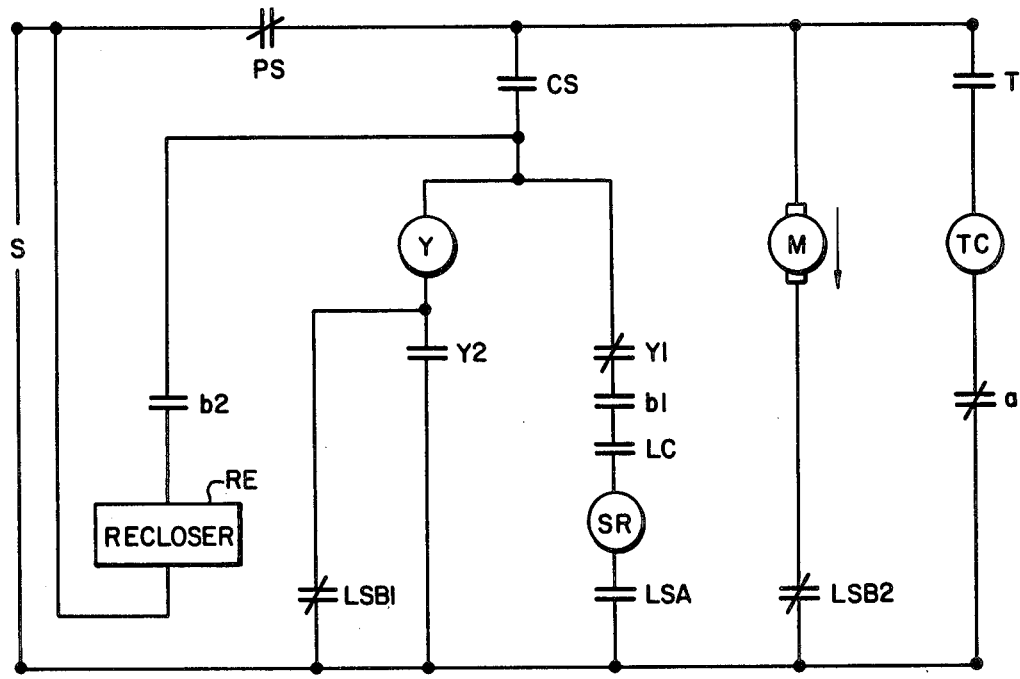

Referring now to FIG. 6, the instant of the initiation of a circuit breaker closing operation is shown. It is presumed that the spring which provides the energy to close the separable main contacts acts relatively quickly once released, however, at this instant, the spring is not yet acted. Initially, the contact switch CS is closed, thus allowing current to flow through the spring release coil SR, and through the previously-mentioned closed contacts Y1, B1, LC and LSA. No power can flow through the Y coil as the Y2 contacts and the LSB1 contacts are both opened. The energization of the spring release coil SR allows the spring SPG to quickly discharge thus quickly closing the circuit breaker main contacts. At this point, the status of the control system may assume one of two states one of which is illustrated in FIG. 7 and one of which is illustrated in FIG. 11. The state associated with FIG. 7 will be discussed first.

Referring now to FIG. 7, it can be seen that the closure of the circuit breaker has occurred and leaves the main contacts closed. The closure of the contacts discharges the spring. Consequently, the contacts LSA, LSB1 and LSB2 reverse state, thus closing contacts LSB1 and LSB2 and opening contact LSA. This allows electrical current to flow through the motor M to immediately begin recharging the spring. It is to be noted that the operating conditions for which the contacts LSA, LSB1 and LSB2 operate are dependent upon the fully charged or not-fully-charged status of the spring. Consequently, even through the spring is charging, it is in a not-fully charged state. This is why the contacts LSB1 and LSB2 are closed and the contacts LSA are open. It is presumed with respect to FIG. 7 that the control switch CS is maintained closed either electrically or manually. The closing of the circuit breaker thus places the Y coil in a conductive state through the closed CS contacts and the closed LSB1 contacts. This energizes the Y coil thus quickly reversing the state of its contacts Y1 and Y2. Y1, which is normally closed, becomes opened, and Y2, which is normally open, becomes closed. In a like manner, since the circuit breaker has been closed, the a, b1 and b2 contacts change state. The a contact becomes closed and the b1 and the b2 contacts become opened. Since the mechanical linkage mechanism for closing the circuit breaker is not at this time necessarily in a state for reclosing the circuit breaker, the latch check switch is opened. Finally, as was mentioned previously, the spring status switch LSA is opened. At this time, it can be easily seen that no energy can be provided to the spring release coil SR because all of its four serially-connected contacts, mainly Y1, b1, LC and LSA are opened. Furthermore, the Y2 contact acts as a seal-in or latch for the Y coil, thus maintaining it energized even if the LSB1 contact should open. As long as the Y coil is energized, the Y1 contacts will not be closed and thus, regardless of the status of the other three contacts, b1, LC, and LSA, the spring release coil SR cannot be energized.

Figure 8:
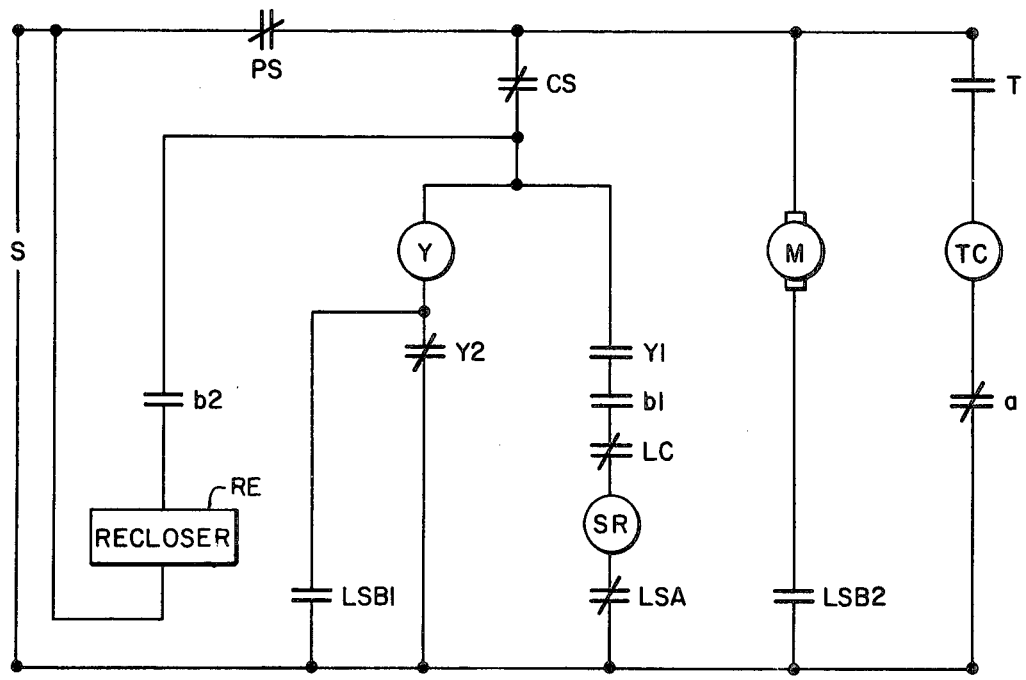

Referring now to FIG. 8, the status of the circuit breaker control system after the spring has become charged and the latch mechanism has been properly set is shown. In this case, since the spring is charged, the spring status contacts LSA, LSB1 and LSB2 once again change state, thus turning off the motor M and closing at least one of the contacts which is in series with the spring release coil, that contact being contact LSA. The latch check switch LC is also closed. It is important to remember at this time that the closing switch CS is still maintained in a closed state, but the circuit breaker is closed and the spring is charged. The circuit breaker may thus be opened again, but it cannot be reclosed at this time because the Y coil maintains the Y1 contact in an opened position.

Figure 9:
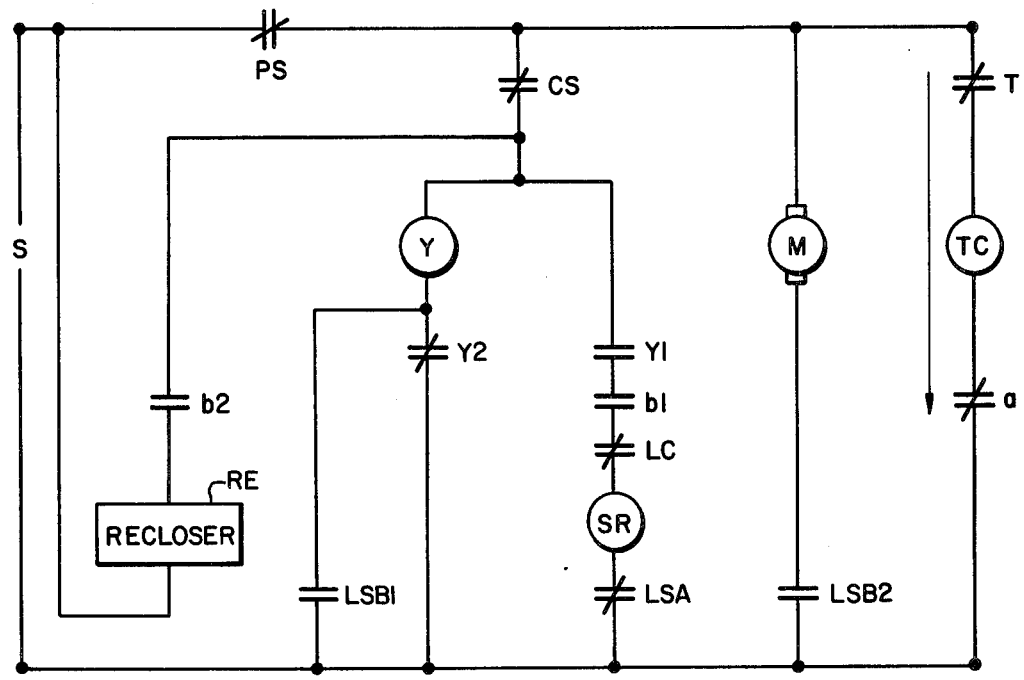

Referring now to FIG. 9, the instant of the initiation of a tripping operation is illustrated. In this case, the trip contact T is made or closed thus providing a completed series circuit through the trip coil TC and the closed auxiliary contact a. At this point, the circuit breaker is opening, but the spring remains charged. The status of the other contacts are essentially the same as that shown in FIG. 8.

Figure 10:
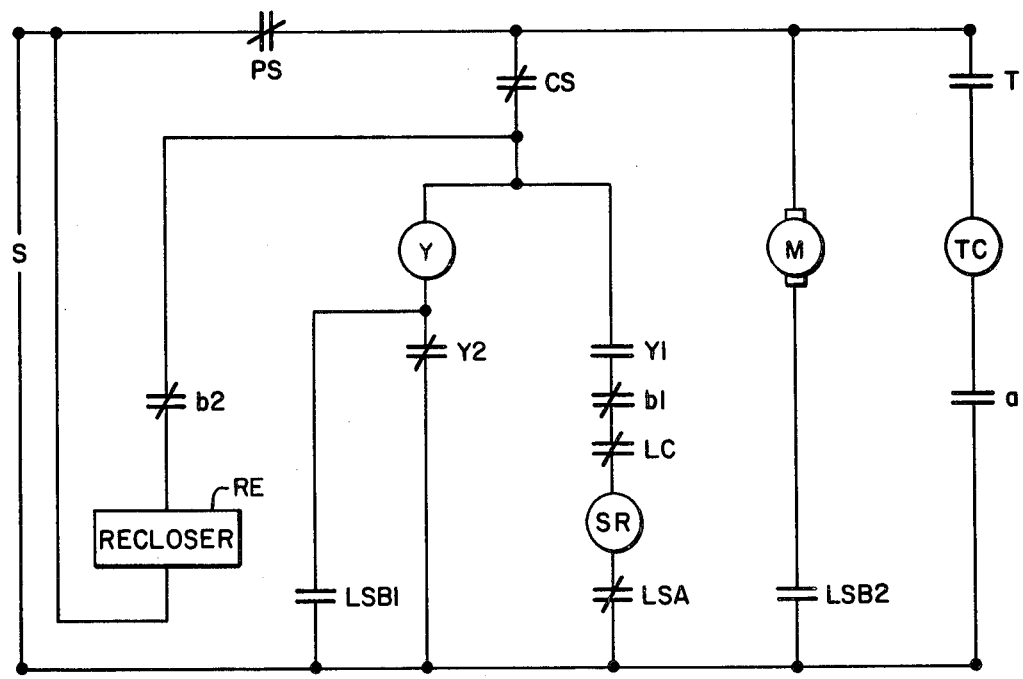

Referring now to FIG. 10, it can be seen that the circuit breaker is now opened and the spring is still charged. This is essentially the same circuit breaker and spring status as was described with respect to FIG. 5. One would think that under normal circumstances the circuit breaker would then reclose quite easily. However, such is not the case because the control switch CS and the Y2 contact have been maintained in a closed state, thus maintaining the Y coil energized, thus maintaining the Y1 contact opened. It can be seen at this point that the auxiliary contacts for the main circuit breaker have changed states so that the contact a is open and the contacts b1 and b2 are closed. At this point, it will be noted that except for the fact that the Y1 contact is open, the spring release coil could be energized. Obviously, the control switch CS is closed and the contacts b1, LC and LSA are all closed. However, no energy will be provided to the spring release coil until the Y coil is deenergized which will allow the Y1 contact to be closed. This will not happen until the control switch CS is released. This is the anti-pumping feature of the present invention. The circuit breaker has closed and reopened presumably on a fault but cannot be reclosed or "pumped" again until the closing switch has been opened and then once again closed. At this point, the closing switch can be opened and the circuit will revert exactly to the status shown in FIG. 5, in which case the operating sequence described previously with respect to FIGS. 6, 7, 8, 9, and 10 may be repeated. However, it must be remembered in each case that a subsequent opening and closing of the control switch CS is necessary in each instance to index or iterate the operating scheme.

Refer now to FIG. 11. As was described previously, the status of the circuit breaker control system as shown in FIG. 11 is one of the two alternatives which may occur after the operation described with respect to FIG. 6, it being remembered that in regard to FIG. 6, that the initiation of a circuit breaker closing operation was described. In the present case, it is presumed that the control switch CS rather than being permanently held closed is immediately released upon energization of the spring release coil SR. Such being the case, the circuit breaker is closed, and the spring is in a charging status as was described with respect to FIGS. 4 and 7. The trip coil TC is in a state for a subsequent opening of a circuit breaker as the auxiliary contact a is closed. Furthermore, the auxiliary contacts b1 and b2 are open, the latch check switch LC is open, and the spring status switch LSA is open. The spring status switches LSB1 and LSB2 are closed. However, since the closing switch CS has been opened, no energy can be provided to the Y coil for energizing it. Consequently, the Y1 contact is closed as was mentioned previously.

Figure 12:
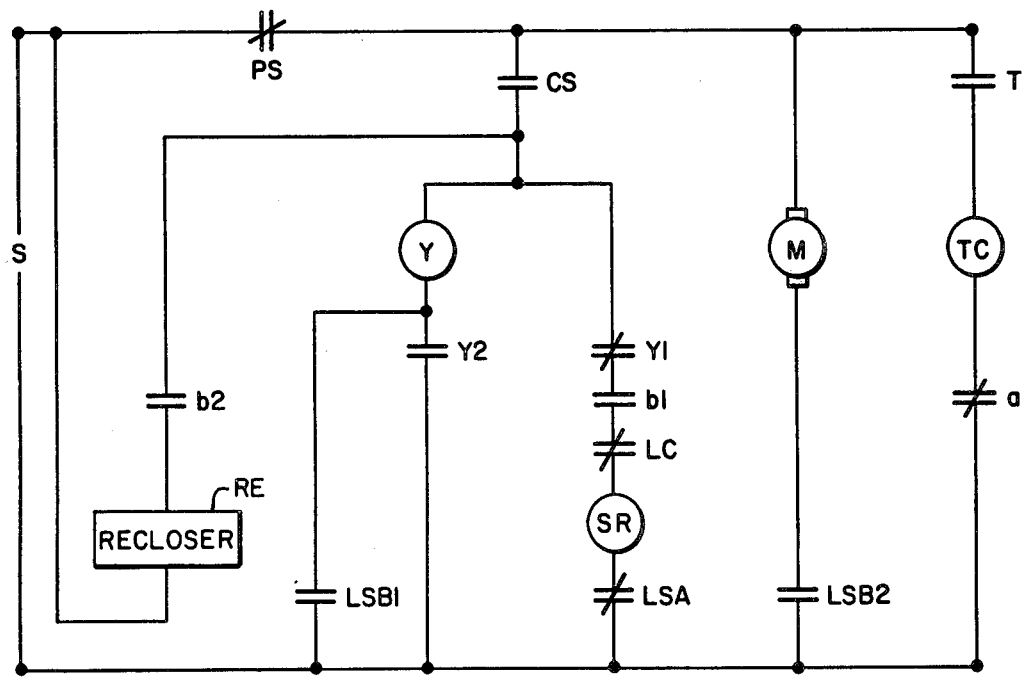

Referring now to FIG. 12, the state of the control system is shown for the situation when the breaker is closed and the spring has been fully charged. In this case, as was the case previously with respect to certain other figures, the spring status switches LSB1 and LSB2 change from a closed to an opened state and the spring status switch LSA changes from an opened to a closed status because the spring has been charged. Presuming that the closing mechanism has been properly set up, the latch check switch LC will be closed. The only two contacts which are in series with the spring release coil SR which are opened, are the control switch CS and the auxiliary contact b1. At this point one of two things can happen: the first thing that can happen will be described with respect to FIG. 13. The second thing that can happen will be described with respect to FIGS. 14 through 16.

Figure 13:
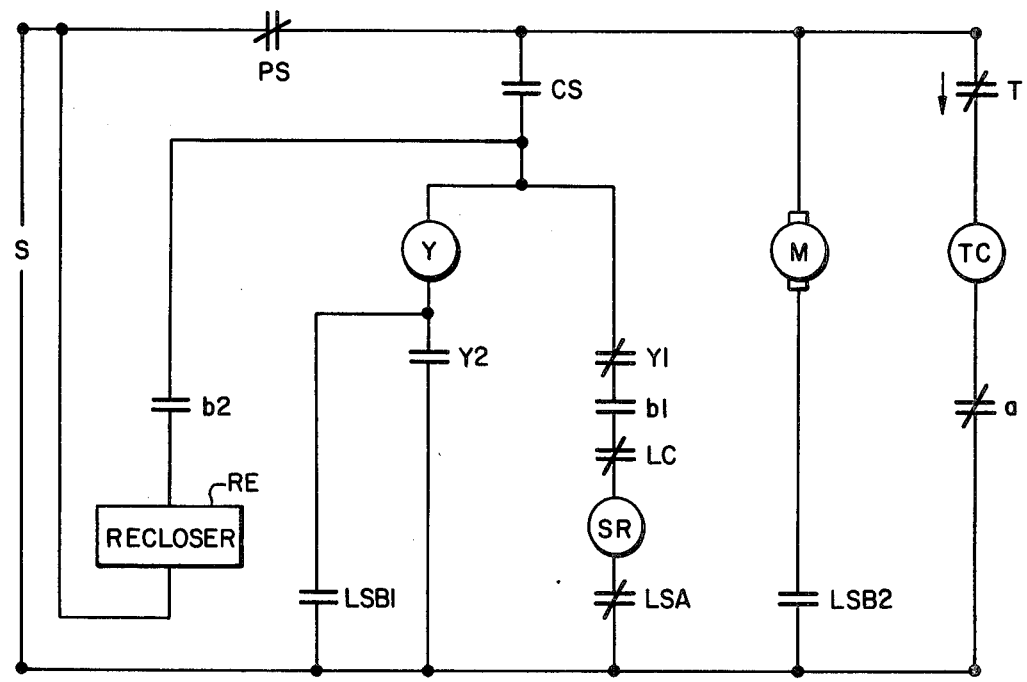

Referring to the first alternative as is shown in FIG. 13, the instant of the initiation of a tripping operation is illustrated. It can be seen that the circuit breaker is tripped by closing trip contact T and energizing the trip coil TC. At this point, the circuit breaker is opening but the spring remains charged. Once the circuit breaker has opened, it of course, will be in an opened state. Since the closing switch CS remains uneffected throughout, the next succeeding state of the circuit breaker control system will be exactly the same as the one shown in FIG. 5. This means that the auxiliary contacts a, b1 and b2 for the separable main contacts will change state. That means that the a contact will open and the contacts b1 and b2 will close. At this point, the circuit breaker control system is free to iterate through the operational sequences shown with respect to FIG. 7 et sequel or to iterate through the oper sequence shown with respect to FIG. 11 et sequel. Which operation is chosen depends upon the status of the closing switch CS. If it is maintained closed, then the operating sequence shown with respect to FIGS. 7, 8, 9, and 10 will take place, if it is maintained opened then the operating sequence shown with respect to FIGS. 11, 12, 13, and 5 will take place.

Figure 14:
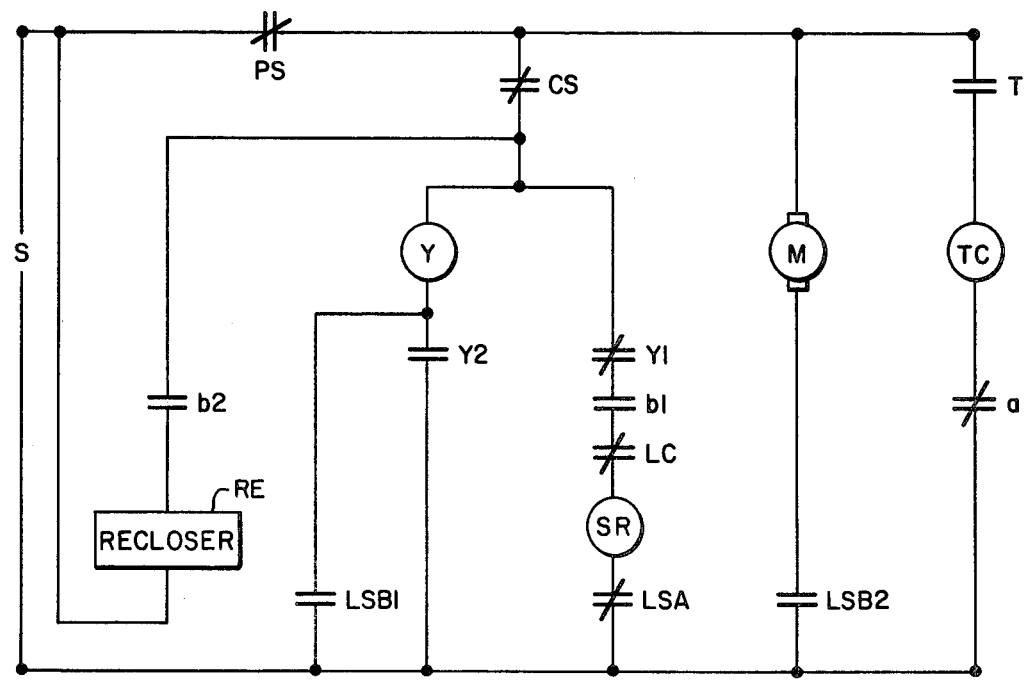
Figure 15:
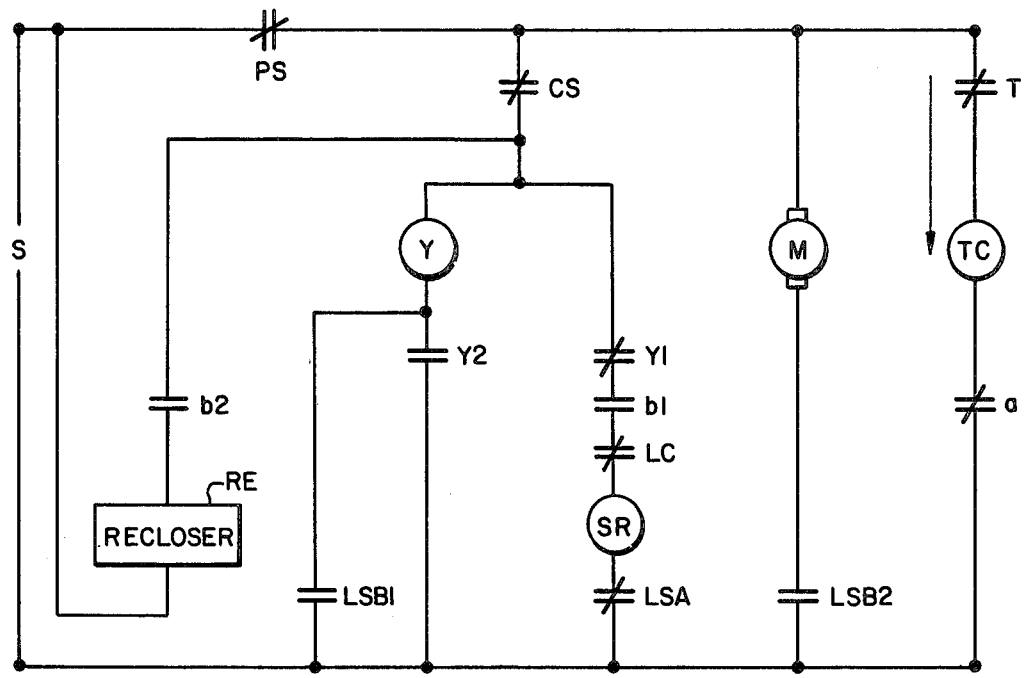
Figure 16:
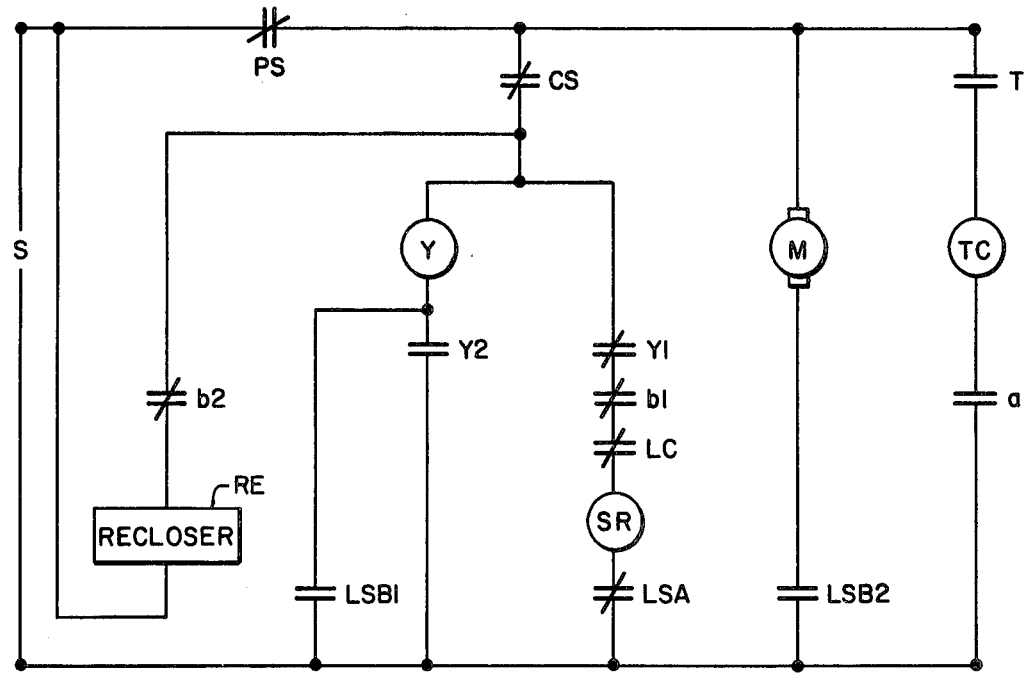

As was described previously, the operating sequence with respect to FIGS. 11 and 12 includes a second alternative, which is shown in FIGS. 14 through 16. Referring, therefore, to FIG. 14 it can be presumed that the closing switch CS is closed while the circuit breaker is in a closed state and while the spring is charged. There will be no closing action because contact b1 in series with spring release coil SR is open, as obviously the circuit breaker does not need to be closed as it already is closed. The circuit contact arrangements are essentially the same as shown in FIG. 12 with the exception of the fact that the closing switch CS is closed. This has importance in a subsequent tripping operation as will be described hereafter.

Referring now to FIG. 15, the instant of the initiation of a tripping operation for the circuit breaker is shown. At this point, the circuit breaker is opening but the spring remains charged. The tripping operation is initiated by the closing of the trip switch T to allow current to flow through the trip coil TC. The circuit contact arrangements are essentially the same as shown in FIG. 13 with the exception of the fact that the closing switch CS is closed.

Referring now to FIG. 16, the effect of the tripping of the circuit breaker with the closing switch CS put into a closed state some time after the circuit breaker was originally closed is shown. In this case, the circuit breaker is open, the spring is charged as it remained charged from the operation of FIGS. 11 and 12. But the spring release coil is now in a state for allowing subsequent reclosing of the circuit breaker since the switch CS is closed, the Y1 contacts are closed, the b1 contacts is closed, the latch check switch is closed, and the spring status switch LSA is closed. Essentially, the only difference between the status shown in FIG. 16 and that shown in FIG. 15 is the change in the status of the auxiliary contacts a, b1, and b2. At this point, the status of the circuit breaker is essentially the same as that shown in FIG. 6. This means that automatically, the spring release coil will be quickly energized, the circuit breaker will begin to close and the spring will begin to discharge. Thus, depending upon the further status of the closing switch CS, the operation will iterate through the sequence depicted with respect to FIGS. 7, 8, 9, and 10 or the sequence depicted with respect to FIGS. 11, 12, 13, and 5 or the sequence depicted with respect to FIGS. 11, 12, 14, 15, and 16.

With regard to the foregoing operations, there are a number of important features to be noted. If the circuit breaker is closed and its control switch or closing switch CS is maintained in a closed state as is depicted in FIGS. 7 through 10, a subsequent reclosing of the circuit breaker will not occur. If the circuit breaker is closed and the control switch or closing switch CS is quickly opened, then reclosure of the circuit breaker is allowable and possible. Furthermore, if the circuit breaker is closed and the control switch CS is reopened and then subsequently reclosed, the circuit breaker will immediately close again upon reopening. Consequently, the latter sequence is different from the sequence depicted in FIGS. 7 through 10. The reason for this is the fact that the latter sequence does not demand or require an anti-pumping action, as the control switch has been reopened after the closing of the circuit breaker.

Figure 17:
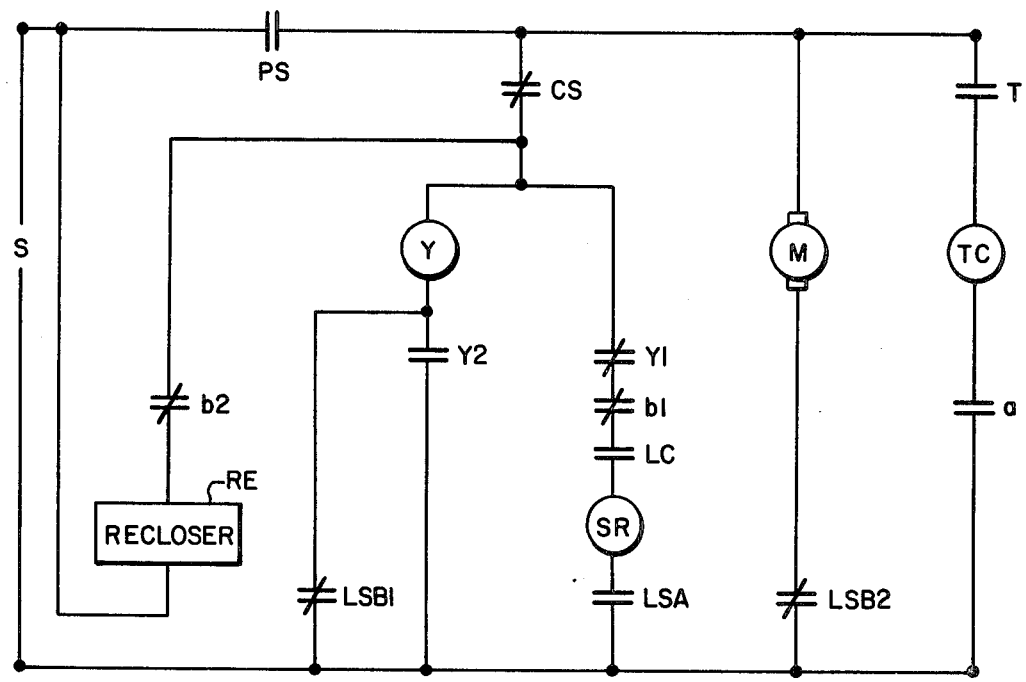
FIGS. 17 through 19 show the diagrams of FIGS. 3 through 16 for the situation where the control switch is closed before the power switch is closed.
Figure 18:
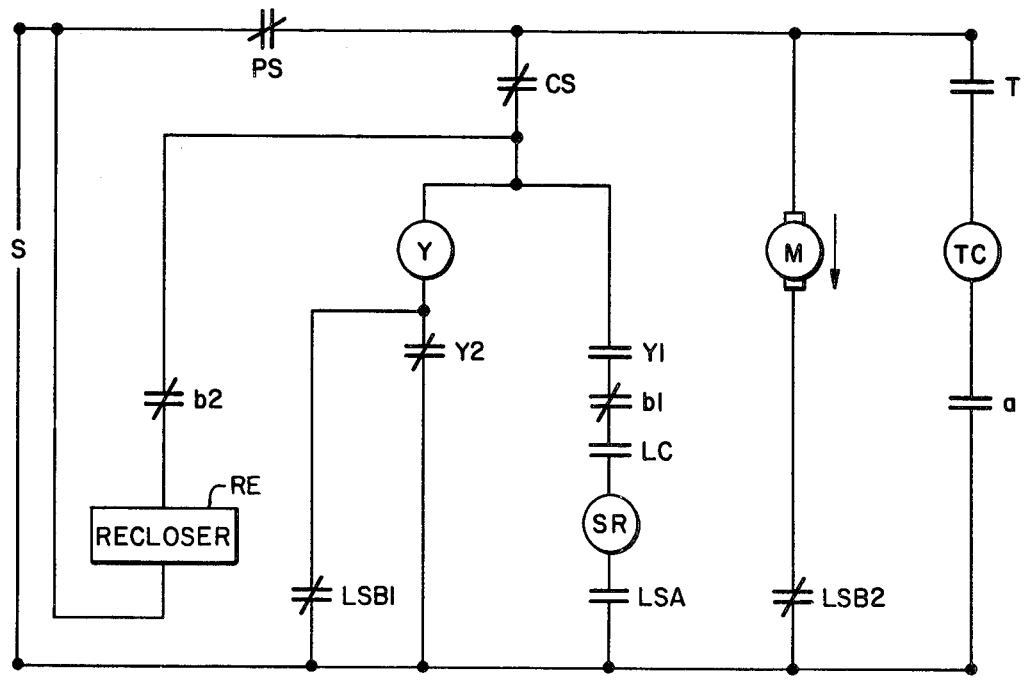
Figure 19:
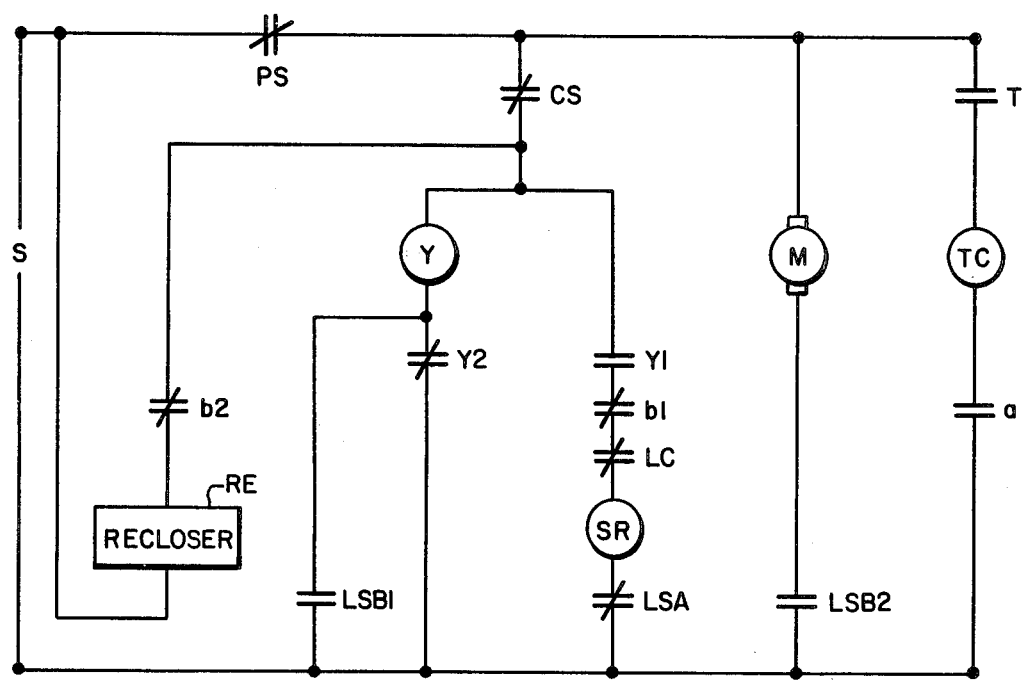

Referring now to FIGS. 17 through 19, the operation of the anti-pumping circuit breaker apparatus in the event that the closing switch CS is in a closed state prior to the closing of the power switch PS is described. It can be easily seen that in certain circumstances, the energizing power for the circuit interrupter control system as supplied by the source S may not be routed to the control system before the control switch CS is closed. In this event, it is desirous to prevent the circuit breaker from closing when the power switch PS is eventually closed. FIG. 17 shows the control system in a state in which the breaker is opened and the spring is discharged. Such being the case, the status contacts LSB2 and LSB1 are closed while the status contacts LSA are opened. Likewise, the latch check switch LC is opened. Since the Y coil is not energized, because there is no power available for so doing, the normally-closed Y1 contact is closed, and the normally-open Y2 contact is open. Furthermore, since the breaker is open, the complementary auxiliary contacts b1 and b2 are closed and the auxiliary contacts a are opened. As was mentioned previously, the closing switch CS is maintained in the closed position either electrically or mechanically while the power supply switch PS is opened.

Referring now to FIG. 18, the operation of the circuit breaker apparatus is described for the situation which the power switch PS is then closed. In this case, the breaker is still open, but the spring begins to charge because power is provided to the charging motor M through the closed contacts LSB2. When the power is applied, the Y coil becomes energized through the closing switch CS and through the status contacts LSB1. This immediately reverses the status of the contacts Y1 and Y2 such that contact Y1 is opened and contact Y2 is closed, thus sealing in the Y coil. Contacts b1 and b2 remain closed because the circuit breaker is still open.

Referring now to FIG. 19, the status of the circuit is shown when the spring has become fully charged. At this time, the status contacts LSB2 and LSB1 are opened, and the status contacts LSA are closed. Presuming that the latch mechanism is in the proper state, the latch check switch LC also closes. The other contact arrangements are the same as was described with respect to FIG. 18. In this case, the circuit breaker is in a state which is ready for closing of the circuit breaker. This situation is essentially the one shown with respect to FIG. 10. If the closing switch CS is opened and then reclosed at this time, the operation of the circuit breaker apparatus will be the same as that described with respect to FIG. 5 and the various possibilities that follow from the operation described therein. If the switch CS is reclosed and maintained closed, the operating sequence will be essentially the same as that described with respect to FIGS. 6, 7, 8, 9 and 10. If, on the other hand, the circuit breaker switch CS is closed and then quickly opened, the operating sequence will follow that described with respect to FIGS. 6, 11, 12, 13 and 5 or 6, 11, 12, 14, 15 and 16 as the case may be. A subsequent tripping of the circuit breaker will be prevented unless the closing switch CS is open and once again closed.

All the FIGS. 1 through 19 show a reclosure device RE interconnected with the spring release coil SR by way of auxiliary contact b2. This device constitutes no main part of the invention, but is merely shown for purposes of clarifying the action of the circuit breaker apparatus. In general, it is well known that reclosure devices may be provided under certain operating conditions and circumstances and such a reclosure is shown. It is to be noted that the spring release coil SR is isolated from both the closing switch CS and the reclosure by the same contact Y1. Consequently, pumping during operation of the reclosure RE will be prevented.

It is to be understood with respect to the embodiments of this invention that the circuit breaker control system described herein is not dependent on the particular contact arrangement for the separable main contacts. They may be of the vacuum breaker type or of the puffer type or of the air type or any other suitable type. It is also to be understood that the reclosure circuit RE previously described is not a necessary part of the invention nor is the latch check switch LC. It is also to be understood that the charging means for the spring need not necessarily be the motor M. Any other device which can be utilized to charge a spring may be used provided it meets the qualifications set forth in the description provided previously.

The apparatus taught with respect to the embodiments of this invention has many advantages. The apparatus permits the closing of a breaker by means of either a momentarily-closed contact or a maintained closed contact. It incorporates an anti-pump feature and it permits instantaneous reclosing and subsequent reclosings under appropriate circumstances. Another advantage lies in the fact that the circuit breaker arrangement obviates the need for a voltage divider type actuating system such as is shown in the prior art. Of course, another advantage lies in the fact that the circuit breaker provides an anti-pump feature which is very desirable. Another advantage lies in the fact that the particular type of disclosed arrangement obviates the need for sensitive resistance coordination between various elements of the circuit breaker control system. Another advantage lies in the fact that the circuit breaker control system is accurate, reliable, and relatively fast in operation.

What is claimed is:

1. An anti-pumping circuit breaker, comprising:
   (a) separable main contact means which may be in either an opened or closed state;
   (b) electrically operable close initiation means for changing the status of said separable main contact means from opened or closed;
   (c) a source of control power;
   (d) chargeable mechanical energy means interconnected with said separable main contact means and said close initiation means for supplying the power, when charged, to close said separable main contact means upon command from said close initiation means;
   (e) first status means disposed in cooperating relationship with said mechanical energy means and having the characteristic of being electrically non-conductive when said mechanical energy means is discharged and electrically conductive when said mechanical energy means is charged;
   (f) second status means also disposed in cooperating relationship with said mechanical energy means and having the characteristic of being electrically non-conductive when said mechanical energy means is charged and electrically conductive when said energy mechanical means is discharged;
   (g) main contact means status means disposed in co-operation with said main contact means and having the characteristic of being electrically non-conductive when said main contact means are closed and electrically conductive when said main contact means are opened;
   (h) electrically operable auxiliary relay means with auxiliary contact means for controlling the electrical conduction characteristic of said auxiliary contact means, said auxiliary contact means being electrically conductive only when said auxiliary relay means is in a first energized state; and
   (i) closing switch means for energizing said close initiation means, said closing switch means being electrically connected in series circuit relationship with said auxiliary relay means and said second status means all across said source of control power, said closing switch being also connected in series circuit relationship with said close initiation means, said first status means, said main contact means status means and said auxiliary contact means all across said source of control power for energizing said close initiation means for thus discharging said chargeable mechanical energy means for thus closing said separable main contact means only when said closing switch means, said first status means, said main contact means status means and said auxiliary contact means are simultaneously in a state of electrical conduction, said latter condition only occurring while said first status means is in a said conducting state and said closing switch means is in said conducting state.

2. An anti-pumping circuit breaker, comprising:
   (a) separable main contact means disposed in an open state;
   (b) a charged closing spring interconnected mechanically with said main contact means for closing said open main contact means upon discharge of said spring;
   (c) electrically operated spring release means mechanically disposed for causing discharge of said spring when electrically energized to thus close said separable main contact means;
   (d) electrically operable auxiliary coil means having a set of normally closed contacts and a complementary set of normally open contacts, said normally closed contacts being connected in series circuit relationship with said spring release means, said normally opened contacts being connected in series circuit relationship with said auxiliary coil means;
   (e) circuit breaker closing switch means connected in series circuit relationship with said normally closed contacts and said spring release means and also being connected in separate series circuit relationship with said auxiliary coil means and said normally opened contacts thereof;
   (f) closing spring status contacts disposed in cooperating relationship with said closing spring, said status contacts being connected in parallel circuit relationship with said normally opened contacts; and
   (g) power supply means connected in circuit relationship with said closing switch means to supply power to said spring release means through said normally closed contacts when said closing switch means is closed to thus discharge said spring to thus close said main contact means and to close said status contacts to energize said auxiliary coil means from said power supply means through said closing switch means, said auxiliary coil means being maintained energized regardless of the further action of said status contacts by the closure of said normally opened contacts, said normally closed contacts thus being disposed in an open state to prevent further energization of said spring release means until said auxiliary coil means is once again disposed in a deenergized state upon the change of disposition of said closing switch means to an open state.

3. An anti-pumping circuit breaker, comprising:
   (a) separable main contacts;
   (b) closing means disposed in cooperating relationship with said main contacts for supplying mechanical energy to close said separable main contacts;
   (c) electrical current operated closing trigger means for actuating said closing means to supply said mechanical energy to close said separable main contacts;
   (d) electrical current operated prevent means for preventing the electrical energization of said trigger means under predetermined circumstances, said prevent means including an electrically energizable control portion and a separate electrical path blocking means which opens or closes in relationship to the electrical status of such control portion, said blocking means being connected in series circuit relationship with said trigger means for preventing the energization of said trigger means by blocking the path of current flow to said trigger means when said prevent means is energized;

(e) status means which cooperates with said closing means for conducting current when said closing means is not disposed to supply said mechanical energy to close said separable main contacts, said status means being connected in series circuit relationship with said prevent means;

(f) power supply means for providing electrical current to said closing trigger means and to said control portion of said prevent means; and (g) closing switch means connected in series circuit relationship with said trigger means and in independent series circuit relationship with said control portion of said prevent means for conducting said electrical current from said power supply means to said control portion of said prevent means when said closing switch means and said status means are in a state to simultaneously conduct electrical current to thus energize said control portion of said prevent means to thus prevent energization of said trigger means, said energization of said control portion of said prevent means continuing until said closing switch means is opened.

4. The combination as claimed in claim 3 including a prevent means path conducting means which also opens or closes in relationship to the electrical status of said control portion, said conducting means being connected in parallel circuit relationship with said status means and series circuit relationship with said prevent means control portion for continuing to conduct electrical current through said prevent means control portion to maintain said prevent means control portion energized after said status means no longer conducts and before said closing switch means is opened.

5. An anti-pumping circuit breaker, comprising:
(a) separable main contacts;
(b) a closing spring mechanically interconnected with said separable main contacts;
(c) an electrical spring release coil for being energized by electrical current to release said closing spring to close said main contacts;
(d) an electrical auxiliary relay coil having normally closed contacts which are connected in series circuit relationship with said spring release coil for allowing energizing current through flow to said spring release coil except when said auxiliary coil is energized;
(e) status contacts which cooperate with said spring in a such a manner as to be closed when said spring is not substantially mechanically charged and to be opened when said spring is substantially mechanically charged, said status contacts being connected in series circuit relationship with said auxiliary coil;

(f) power supply means for supplying electrical energizing current to said spring release coil and said auxiliary coil; and (g) a closing switch connected in series circuit relationship with said spring release coil and in independent series circuit relationship with said auxiliary coil for conducting electrical energizing current from said power supply means to said auxiliary relay coil when said closing switch and said status contacts are both in a closed state to thus energize said auxiliary coil to thus open said normally closed contacts thereof to thus prevent energization of said spring release coil, said energization of said auxiliary coil continuing until said closing switch is opened.

6. The combination as claimed in claim 5 including a set of normally opened contacts for said auxiliary relay coil which are connected in series circuit relationship with said auxiliary coil and parallel circuit relationship with said status contacts for continuing to conduct electrical current through said auxiliary coil after said status contacts open and before said closing switch is opened.

7. A circuit breaker comprising:
(a) opened separable main contacts;
(b) a discharged spring for closing said main contacts when subsequently charged and then released;
(c) spring charging means;
(d) status contacts which are closed when said spring is discharged and opened when said spring becomes charged;
(e) a spring release coil for discharging said spring;
(f) an auxiliary coil having a first set of auxiliary contacts which are normally opened and connected in series circuit relationship with said auxiliary coil and parallel circuit relationship with said status contacts for sealing said auxiliary coil in when said auxiliary coil is in an energized state, said auxiliary coil also having a second set of auxiliary contacts which are normally closed and connected in series circuit relationship with said spring release coil for preventing energization thereof, when said auxiliary coil is energized;
(g) a closed circuit breaker closing switch;
(h) a source of power; and
(i) a power switch connected to said source of power and in independent series circuit relationship with said spring charging means and said closed circuit breaker closing switch, said circuit breaker closing switch being connected in independent series circuit relationship with said spring release coil and said auxiliary coil, said power switch at least once actuating said spring charging means to charge said spring simultaneously with the energization of said auxiliary coil to therefore seal said auxiliary coil in even after said status contacts open, thus maintaining said second set of auxiliary contacts open, thus preventing the energization of said spring release coil after charging of said spring until said closing switch has been reopened and then closed.

* * * * *